US012637245B2

(12) United States Patent
Mondini et al.

(10) Patent No.: US 12,637,245 B2
(45) Date of Patent: May 26, 2026

(54) APPARATUS AND METHOD FOR POSITIONING PRODUCTS ON SUPPORTS

(71) Applicant: G.MONDINI S.P.A., Cologne (IT)

(72) Inventors: Giovanni Mondini, Cologne (IT); Paolo Carlo Mondini, Cologne (IT)

(73) Assignee: G.MONDINI S.P.A., Cologne (IT)

( * ) Notice: Subject to any disclaimer, the term of this patent is extended or adjusted under 35 U.S.C. 154(b) by 86 days.

(21) Appl. No.: 18/554,107

(22) PCT Filed: Apr. 12, 2022

(86) PCT No.: PCT/IB2022/053427
§ 371 (c)(1),
(2) Date: Oct. 5, 2023

(87) PCT Pub. No.: WO2022/219531
PCT Pub. Date: Oct. 20, 2022

(65) Prior Publication Data
US 2024/0051695 A1     Feb. 15, 2024

(30) Foreign Application Priority Data

Apr. 15, 2021     (IT) ........................ 102021000009569

(51) Int. Cl.
*B65B 43/42*          (2006.01)
*B65B 5/04*          (2006.01)
(Continued)

(52) U.S. Cl.
CPC ............... *B65B 43/42* (2013.01); *B65B 5/04* (2013.01); *B65B 25/065* (2013.01); *B65B 35/24* (2013.01);
(Continued)

(58) Field of Classification Search
CPC ......... B65B 43/42; B65B 43/62; B65B 43/06; B65B 5/04; B65B 25/065; B65B 35/24;
(Continued)

(56) References Cited

U.S. PATENT DOCUMENTS 3,354,613 A * 11/1967 Anderson ............. B65B 25/065
198/463.3
4,052,836 A * 10/1977 Shaw ...................... B65B 3/323
426/414
(Continued)

FOREIGN PATENT DOCUMENTS

DE        102014116232        5/2016
DE        102016224951        6/2018
(Continued)

OTHER PUBLICATIONS

Beckhoff Flying Motion XPlanar (Year: 2018).*
(Continued)

*Primary Examiner* — Robert F Long
*Assistant Examiner* — Eduardo R Ferrero
(74) *Attorney, Agent, or Firm* — Chrisman Gallo Tochtrop LLC

(57)          ABSTRACT

An apparatus and method for positioning products (1) on supports (2), wherein the supports (2) are moved by means of magnetic shuttles (4) of a planar motor conveyor (3) between a plurality of operating stations, and wherein, at an unloading station (16), each product is fed with an auxiliary conveyor (35) above a gliding plane (5) of the planar motor conveyor (3), and is unloaded onto a support (2) which is supported by a magnetic shuttle (4), while the magnetic shuttle (4) moves below the auxiliary conveyor (35).

22 Claims, 10 Drawing Sheets

(51) Int. Cl.
| | | |
|---|---|---|
| *B65B 25/06* | (2006.01) | |
| *B65B 35/24* | (2006.01) | |
| *B65B 43/62* | (2006.01) | |
| *B65B 57/12* | (2006.01) | |
| *B65B 59/00* | (2006.01) | |
| *B65G 47/244* | (2006.01) | |
| *B65G 47/46* | (2006.01) | |
| *B65G 54/02* | (2006.01) | |

(52) U.S. Cl.
CPC .............. *B65B 43/62* (2013.01); *B65B 57/12* (2013.01); *B65B 59/001* (2019.05); *B65G 47/244* (2013.01); *B65G 47/46* (2013.01); *B65G 54/02* (2013.01); *B65B 2210/02* (2013.01); *B65G 2203/0283* (2013.01); *B65G 2203/041* (2013.01)

(58) Field of Classification Search
CPC . B65B 59/001; B65B 59/003; B65B 2210/02; B65G 47/244; B65G 47/46; B65G 54/02; B65G 2203/0283; B65G 2203/041; B65D 88/68; B65D 2303/00
USPC ...................................... 493/3; 141/163, 171
See application file for complete search history.

(56) References Cited

U.S. PATENT DOCUMENTS

| | | | | |
|---|---|---|---|---|
| 4,704,841 | A * | 11/1987 | Langenbeck ........... | B65B 5/101 53/448 |
| 6,349,526 | B1 * | 2/2002 | Newman ................... | B07C 5/10 53/425 |
| 6,935,215 | B2 * | 8/2005 | Lindee ..................... | B26D 7/32 83/155 |
| 8,956,861 | B2 * | 2/2015 | Houjou ................. | G02B 21/34 422/561 |
| 9,108,807 | B1 * | 8/2015 | Ogle, II ................ | B65G 54/02 |
| 9,202,719 | B2 | 12/2015 | Lu et al. | |
| 9,828,192 | B2 | 11/2017 | Baechle et al. | |
| 9,878,813 | B2 | 1/2018 | Eberhardt et al. | |
| 10,608,518 | B2 * | 3/2020 | Brucker ............... | H02K 41/031 |
| 11,038,410 | B2 | 6/2021 | Brinkmann et al. | |
| 11,146,160 | B2 | 10/2021 | Frangen | |
| 11,286,075 | B2 * | 3/2022 | Grasselli ................. | B65B 5/068 |
| 11,643,277 | B2 * | 5/2023 | Nickel ................... | B65G 23/23 198/805 |
| 11,851,218 | B1 * | 12/2023 | Hoffman .............. | B65G 47/248 |
| 11,855,557 | B2 * | 12/2023 | Luthe ................... | H02P 25/064 |
| 12,040,675 | B2 * | 7/2024 | Luthe ........................ | H02P 5/00 |
| 2002/0092728 | A1 * | 7/2002 | Tanaka ................... | B65G 1/137 198/315 |
| 2004/0104100 | A1 * | 6/2004 | Schiesser ........... | B65G 47/2445 198/395 |
| 2004/0118084 | A1 * | 6/2004 | Lindee ................. | B65B 35/246 53/251 |
| 2006/0114452 | A1 * | 6/2006 | Schnell ................. | B65G 43/02 356/237.1 |
| 2007/0205405 | A1 * | 9/2007 | Stockmaster ............ | B66D 1/56 254/275 |
| 2008/0118335 | A1 * | 5/2008 | Ishida ................. | G06Q 10/087 414/280 |
| 2010/0221094 | A1 * | 9/2010 | Kuehnemann ......... | B65G 61/00 414/800 |
| 2010/0256810 | A1 * | 10/2010 | Weber ................... | B65G 47/24 198/398 |
| 2012/0159900 | A1 * | 6/2012 | Grasselli ............... | B65G 47/90 53/235 |
| 2013/0081737 | A1 * | 4/2013 | Bassani ................... | B65B 43/42 141/283 |

| | | | | |
|---|---|---|---|---|
| 2013/0108401 | A1 * | 5/2013 | Schaller ............... | B65G 47/918 414/217 |
| 2013/0110280 | A1 * | 5/2013 | Folk ....................... | B25J 9/0093 700/215 |
| 2013/0192175 | A1 | 8/2013 | Matysiak et al. | |
| 2013/0213201 | A1 * | 8/2013 | Malenke .................. | B26D 7/32 83/111 |
| 2014/0285122 | A1 * | 9/2014 | Lu ........................... | H02K 3/28 318/135 |
| 2015/0107959 | A1 | 4/2015 | Engelhardt et al. | |
| 2015/0136570 | A1 * | 5/2015 | Stelzer ................. | B65G 1/1373 198/810.01 |
| 2015/0197353 | A1 | 7/2015 | Bergmann | |
| 2015/0209970 | A1 * | 7/2015 | Weber .................... | B26D 5/007 83/79 |
| 2015/0368046 | A1 * | 12/2015 | LaPierre ............... | B65G 37/00 198/373 |
| 2016/0151916 | A1 * | 6/2016 | Kanno ................... | B25J 9/1697 700/228 |
| 2016/0221762 | A1 * | 8/2016 | Schroader .............. | B65G 47/31 |
| 2017/0050332 | A1 * | 2/2017 | Bauer ................. | A22C 17/0093 |
| 2017/0057751 | A1 * | 3/2017 | Fujihara ............. | B65G 47/8807 |
| 2017/0088361 | A1 * | 3/2017 | Hellenbrand ........ | B65G 47/905 |
| 2017/0225814 | A1 | 8/2017 | Eberhardt et al. | |
| 2017/0225911 | A1 | 8/2017 | Baechle et al. | |
| 2017/0240358 | A1 * | 8/2017 | Janicki ................... | B65G 15/32 |
| 2017/0339967 | A1 * | 11/2017 | Burk .................. | A22C 17/0073 |
| 2017/0343483 | A1 * | 11/2017 | Piana .............. | B65G 17/26 |
| 2018/0056335 | A1 * | 3/2018 | Ogusu ....................... | B07C 5/10 |
| 2018/0086564 | A1 * | 3/2018 | Clössner ................ | B65G 17/34 |
| 2018/0118388 | A1 * | 5/2018 | Grasselli ............... | B65B 25/065 |
| 2018/0205304 | A1 * | 7/2018 | Lu ............................ | H02K 3/26 |
| 2019/0031452 | A1 * | 1/2019 | Koga ................. | B65G 47/905 |
| 2019/0055091 | A1 * | 2/2019 | Achterberg .......... | B65G 47/244 |
| 2019/0255698 | A1 * | 8/2019 | Zeiner ........................ | B25J 5/02 |
| 2019/0283977 | A1 * | 9/2019 | Achenbach ............ | B65B 35/44 |
| 2019/0348898 | A1 | 11/2019 | Frangen | |
| 2019/0375302 | A1 * | 12/2019 | Fukuda ................. | B65G 47/96 |
| 2020/0031594 | A1 * | 1/2020 | Ragan ................... | B65G 35/06 |
| 2020/0074654 | A1 * | 3/2020 | Lu ........................ | B25J 11/0075 |
| 2020/0189855 | A1 * | 6/2020 | Muehlberger ......... | B65G 43/08 |
| 2020/0303997 | A1 * | 9/2020 | Brinkmann ............. | H02K 1/20 |
| 2020/0321846 | A1 | 10/2020 | Brinkmann et al. | |
| 2021/0273592 | A1 * | 9/2021 | Luthe ................... | H02P 25/064 |
| 2021/0347577 | A1 * | 11/2021 | Hayashi ................. | B65G 47/38 |
| 2021/0354934 | A1 * | 11/2021 | Aust ................. | H01L 21/67709 |
| 2023/0034751 | A1 * | 2/2023 | Voelkl .................... | B65B 57/16 |

FOREIGN PATENT DOCUMENTS

| | | | | |
|---|---|---|---|---|
| DE | 102017131324 A1 * | 6/2019 | .......... | H02K 11/215 |
| DE | 102019117431 A1 * | 12/2020 | ............ | B65G 45/10 |
| EP | 2614939 | 1/2014 | | |
| EP | 3172156 A1 | 5/2017 | | |
| EP | 2899001 | 8/2017 | | |
| EP | 3172134 | 8/2018 | | |
| EP | 3656684 | 5/2020 | | |
| EP | 3707808 | 3/2021 | | |
| WO | 0159409 A2 | 8/2001 | | |
| WO | WO-2009150756 A1 * | 12/2009 | .......... | A23C 20/005 |
| WO | 2011042750 | 4/2011 | | |
| WO | 2016012171 A1 | 1/2016 | | |
| WO | WO-2020109274 A1 * | 6/2020 | .......... | H02K 41/031 |
| WO | WO-2020260566 A1 * | 12/2020 | ............ | B65G 45/10 |

OTHER PUBLICATIONS

International Search Report issued on Aug. 28, 2022, in PCT/IB2022/053427, 3 pages.
International Preliminary Report on Patentability, issued on Mar. 31, 2023, in PCT/IB2022/053427, 6 pages.

* cited by examiner

APPARATUS AND METHOD FOR POSITIONING PRODUCTS ON SUPPORTS

This invention relates to an apparatus and a method for positioning products on supports.

The context in which this invention was developed, is that of automated positioning on supports, of fresh food products, in particular food products with irregular shape and which do not have dimensional stability, before a subsequent completion of the packaging. However, the invention proved advantageous for packaging products of any type, in particular in the case of products which are supplied without a predetermined orientation by preceding apparatuses.

The first application for which this invention was developed is that of packaging food products constituted of steaks, or other pieces of meat obtained by cutting a larger piece of meat into pieces (slices).

Therefore, hereinafter in this description explicit reference will be made above all in that context. That does not rule out this invention being applicable even in the context of packaging other types of food products, or even non-food products.

Preparation of packs of steaks or the like, intended for example for large retail chains, usually involves obtaining the steaks by automatically slicing the steaks from a larger piece of meat, in an automatic slicing machine.

As the steaks are gradually sliced, they are made to fall onto an auxiliary conveyor (usually a conveyor belt) which carries them to the packaging line, in particular to a zone for transfer onto supports.

The transfer of the steaks from the auxiliary conveyor to the support is the most delicate operation of the entire packaging process. In fact, during this step, the steaks must be correctly positioned on the support; depending on the type of sealing which will subsequently be carried out, the positioning precision must be more or less high.

For example, if skin packaging will be carried out, the steaks should be positioned far enough from the edges of the support. However, in general, good centring of the product on the support is always required, even just to make the pack more aesthetically appealing to the end customer.

At present the operation for positioning products such as steaks can be carried out exclusively either manually by an operator, or by means of a handling robot.

However, both of these solutions have significant disadvantages.

In the case of manual positioning, there are two main disadvantages: on one hand the limited productivity of an individual operator against a relatively high cost; and on the other hand the fact that for the operator it is a job that is undoubtedly exhausting.

In contrast, where a robot is used, positioning may be fast and precise when the pieces of meat have a predetermined dimensional constancy, that is to say, although they may deform during handling, they substantially have the same shape or the same overall dimensions both when they are still on the auxiliary conveyor, and when they are resting on the target support.

However, in many cases, the pieces of meat are intrinsically dimensionally unstable, and are likely to change their shape when they are lifted by a robot. Consequently, a handling robot may find it very complicated to position the pieces of meat in the best way when those pieces do not have stable and constant dimensions, something which in contrast an operator is always able to do in the best possible way, by "rearranging" the steak on the support.

In the case of food products, above all manual positioning, but also that by means of handling robots, also have the disadvantage of exposing the product to a risk of contamination.

There are similar problems related to positioning in the case of products such as sliced charcuterie, wherein in each support it is necessary to insert multiple slices each with the correct positioning relative to the others.

Therefore, the industrial packaging sector lacks an apparatus which is able to automatically and precisely position on a support, product which are unstable and different from each other, such as the pieces of meat obtained by slicing larger pieces of meat.

In this context the technical purpose which forms the basis of this invention is to provide an apparatus and a method for positioning products on supports which overcome the above-mentioned disadvantages.

In particular the technical purpose of this invention to provide an apparatus and a method for positioning products on supports which allows precise positioning even of products with irregular shape or which do not have dimensional stability.

A further technical purpose of this invention to provide an apparatus and a method for positioning products on supports which allows regular and repeatable positioning even of products which are fed in an irregular way.

It is also a technical purpose of this invention to provide an apparatus and a method for positioning products on supports which, in the case of packaging food products, allow a reduction in the risk of contamination compared with the prior art.

The technical purpose specified and the aims indicated are substantially achieved by an apparatus and a method for positioning products on supports as described in the appended claims.

Further features and the advantages of this invention will be more apparent from the detailed description of several preferred, non-limiting embodiments of an apparatus and a method for positioning products on supports, illustrated with reference to the accompanying drawings, in which.

Figures 1, 2:
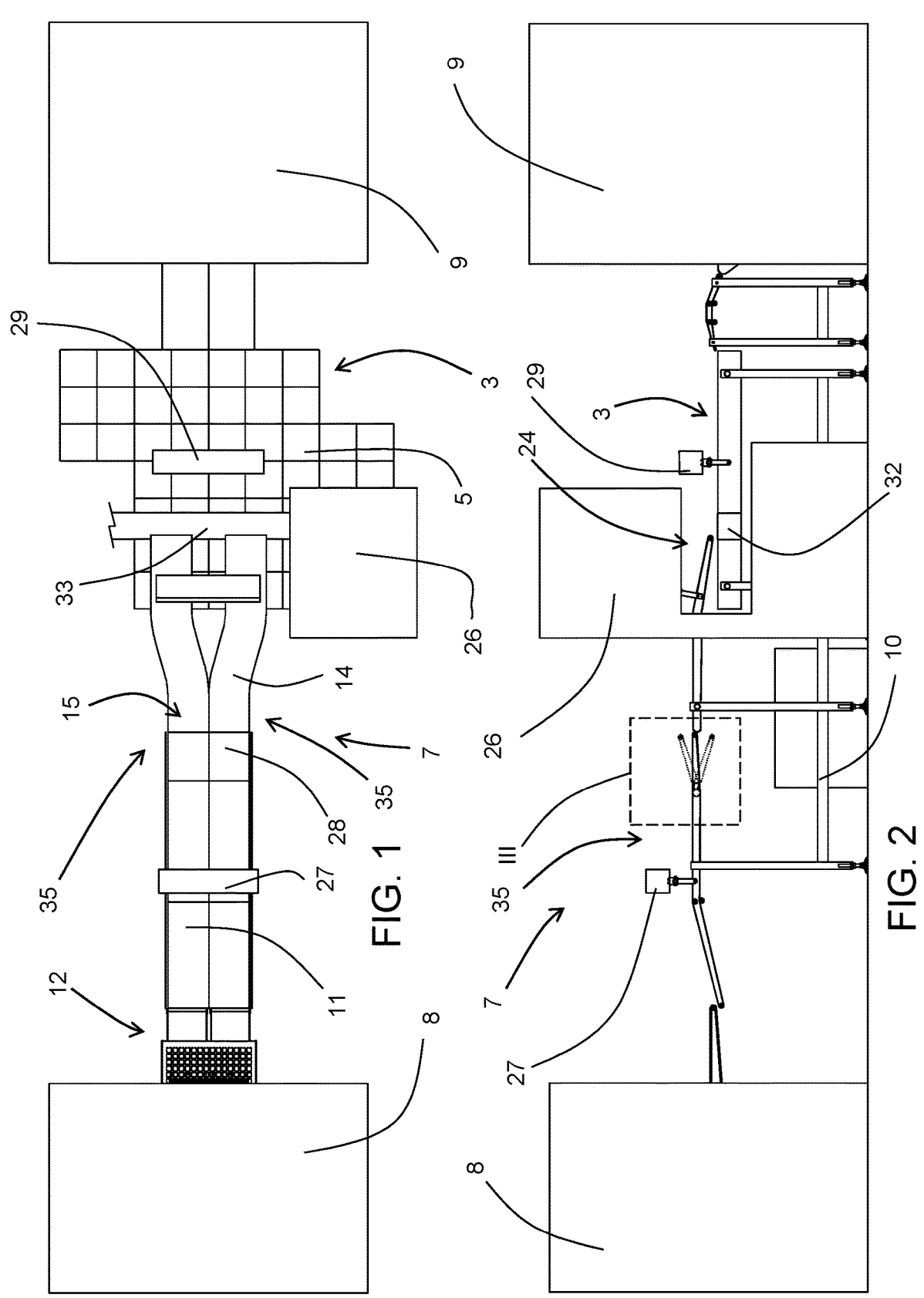
FIG. 1 is a schematic plan view of a line which comprises an apparatus for positioning products on supports in accordance with this invention.
FIG. 2 is a side view of the line of FIG. 1.

A first innovation of this invention is a method for automatically positioning a product 1 on a support 2, which is implemented using a planar motor conveyor 3 and the relative magnetic shuttles 4.

In the context of this invention the support 2 may take any form suitable for the purpose. In particular, it may be constituted of a tray made of any material (paper, plastic, paper-plastic laminate, wood, glass, metal, etc.), with any shape (flat, concave, convex, round, square, rectangular, etc.), divided or not divided into a plurality of separate compartments, provided with pre-cut perforation lines which in use allow it to be separated into multiple pieces, etc. Furthermore, according to this invention on the support on which the products 1 must be positioned there may already be further products/objects present or others may subsequently be added.

As is known, a planar motor conveyor 3 is the two-dimensional evolution of a linear motor, that is to say, a conveying device in which a plurality of magnetic shuttles 4 (in which, that is to say, at least one magnetic field generator, advantageously a permanent magnet, is mounted) are moved in a controlled way over a gliding plane 5, below which a large number of electromagnetic coils with selective activation is mounted. The movement of the magnetic shuttles 4 is obtained by powering each coil in a controlled way. Moreover, advantageously, in the planar motor conveyors 3 it is possible to keep the magnetic shuttles 4 raised relative to the gliding plane 5, making them levitate all the time by means of the magnetic interactions between the coils and the permanent magnets. The principle which is the basis of the planar motor is therefore the same as that which is the basis of known magnetic levitation trains, but extended at two-dimensional level.

Some examples of planar motor conveyor devices are described for example in documents U.S. Pat. No. 9,202,719, EP 3707808, EP 3172156, EP 3172134, DE 102016224951, WO 01/59409 and WO 2016/012171, which should be consulted for further details.

In the context of this invention the definition planar motor conveyor will therefore mean a device of the type described, in which the magnetic shuttles may have between two (simple translation along two Cartesian axes X and Y which are parallel to the gliding plane) and six degrees of freedom (in addition to the two already indicated, the possibility of varying the distance from the gliding plane by translating along an axis Z perpendicular to the axes X and Y, the possibility of rotating or oscillating about the axis Z, and the possibility of oscillating about each of the axes X and Y).

An example of a commercial planar motor conveyor 3 usable in the context of this invention is that marketed under the "XPlanar" brand by the Italian company Beckhoff Automation S.r.l., with registered office in Limbiate.

Another example of a commercial planar motor conveyor 3 usable in the context of this invention is that marketed under the "Acopos 6D" brand by the Italian company B&R Automazione Industriale S.r.l., with registered office in Cesate, Italy, in which the gliding plane 5 is freely configurable at will thanks to the fact that it is constituted of square modules, which can be connected to each other at will. The planar motor conveyor 3 illustrated in the accompanying figures is shown made with this latter technology (its "chessboard" appearance derives from this).

Since it is a known technology, in the context of this invention neither the structure nor the operation of the planar motor conveyor 3 will be described, only its use will be described.

In its most general embodiment, the method according to this invention comprises a loading step, a positioning step, a feed step and a transfer step.

During the loading step at least one support 2 on which a product 1 is to be positioned, is loaded onto a magnetic shuttle 4 of the planar motor conveyor 3 which defines the gliding plane 5. For example, loading may be achieved by making the support 2 fall onto the magnetic shuttle 4 below, in the ways described below in this description with reference to the apparatus. However, this invention may be implemented with any loading system.

During the subsequent positioning step (FIG. 8), the magnetic shuttle 4, onto which the support 2 has been loaded, is brought into a first transfer start position.

As regards the product 1 to be loaded onto the support 2, in contrast, during the feed step (FIG. 8), the product 1 is brought into a second transfer start position.

Figures 8, 9, 10, 11:
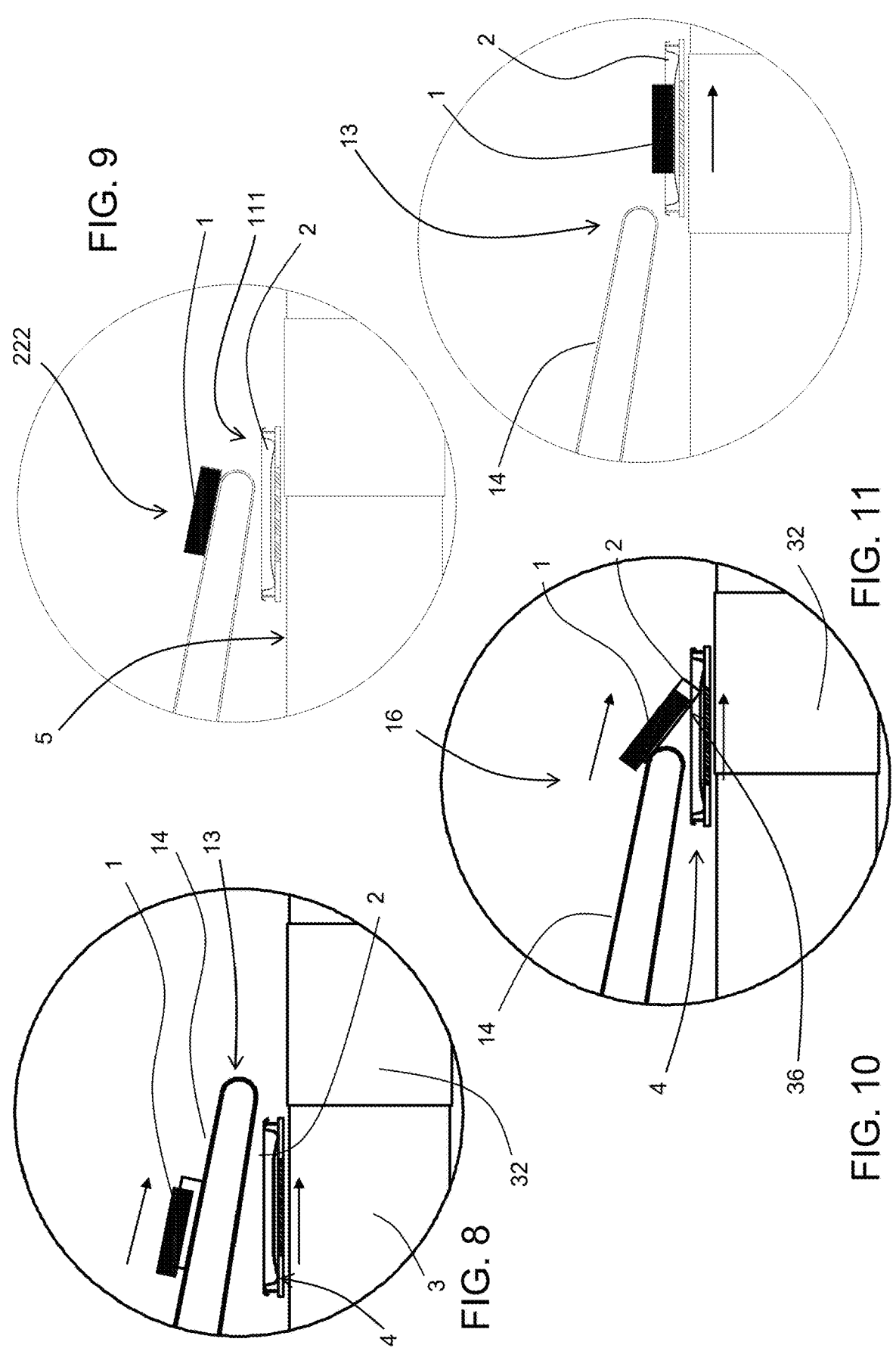
FIGS. 8 to 11 show a sequence of steps for positioning a product on a support, which are performed at the detail VI of FIG. 6.

In accordance with this invention, the first transfer start position 111, and the second transfer start position 222, are selected in such a way that the product 1 and the support 2 onto which the product 1 must be loaded, are positioned in such a way that the product 1 is above the support 2 loaded onto the magnetic shuttle 4 placed in the first transfer start position 111, and at a distance from it (FIG. 9). In some embodiments, the product 1 is retained by a supporting unit, and near an end edge of it, and the projection of the product 1 on the support 2 roughly corresponds to the final positioning to be obtained.

The transfer step starts when the support 2 and the product 1 are placed, respectively, in the first transfer start position 111, and in the second transfer start position 222 (FIG. 9); in fact, at that point, the product 1 is gradually transferred onto the support 2.

According to one innovative aspect of this invention, the transfer step is performed by gradually making the product 1 fall onto the support 2, while the magnetic shuttle 4 simultaneously shifts from the first transfer start position 111, with a known and controlled first velocity (not necessarily constant over time). Advantageously the product 1 is made to move forward projecting above the planar motor conveyor 3 so as to make it descend towards the support 2 below.

In the preferred embodiment, the transfer step in turn comprises, one after another, an approach step and a set-down step.

During the approach step, the product 1 is gradually moved towards the support 2 until a first portion 36 of the product 1 touches the support 2. Advantageously, the first shifting velocity of the magnetic shuttle 4 and of the support 2 is controlled in such a way that the first portion 36 touches the support at a predetermined zone thereof.

During the subsequent set-down step, the product 1 is made to move further forward (fed) with a velocity such that the first portion 36 moves in such a way that it is synchronised with the support 2 (moved by the relative magnetic shuttle 4) until the product 1 is completely positioned on the support 2. In other words, during the set-down step, the magnetic shuttle 4 and the product 1 move with respective controlled velocities in such a way as to avoid dragging of the first portion 36 (and, consequently, of all of the other portions of the product 1) on the support 2.

The direction of movement of the product 1 towards the support 2, both during the approach step, and during the set-down step, can be selected in different ways depending on the applications, said structure of the apparatus which is used and the type of product.

In the preferred embodiments, the product 1 is moved towards the support 2 by making the product 1 move forward projecting from an auxiliary conveyor 35 which supports it. In this case, the auxiliary conveyor 35 defines a product projecting direction which may, or may not, coincide with the direction of movement, as explained in more detail below.

Advantageously, the projecting direction is selected in such a way that it forms an angle of between 0° and 90° with the gliding plane 5.

When the angle is equal to 0°, the product 1 is made to project parallel to the gliding plane 5 (at a predetermined distance from it). If the product 1 is rigid, the movement towards the support 2 therefore occurs when its barycentre also projects allowing rotation of the product 1 towards the gliding plane 5. Therefore, the first portion 36 of the product will be that projecting the furthest, which will be the first to reach the support 2. The direction of movement of the product 1 is therefore variable over time and is parallel to the projecting direction, only until the moment when the barycentre projects and the first portion 36 starts to rotate downwards. From the moment when the first portion 36 touches the support 2, the velocity of forward movement of the product 1 and that of the magnetic shuttle 4 will advantageously be synchronised in such a way that the first portion 36 shifts with the same (vectorial) velocity as the support 2.

Otherwise, if the product 1 is not rigid but is deformable (as, for example, in the case of steaks or cold cuts), as it gradually projects it will tend to bend downwards under the force of gravity. In this case too, the first portion 36 will be that projecting the furthest, but in this case will move towards the support along a direction of movement substantially perpendicular to the gliding plane 5. Moreover, in this case, after the first portion 36 makes contact with the support 2, in order to set down the product 1 on the support 2, it will be sufficient to move the magnetic shuttle 4 with a velocity whose magnitude is equal to the product 1 projecting velocity of forward movement, and whose direction lies in the same vertical plane in which the direction of the product 1 projecting velocity of forward movement lies. If the product is flexible, it is also possible that the direction of movement of the magnetic shuttle 4 (and of the support 2) is inverted one or more times, during the set-down step, for example to position on the support 2 slices which are folded over themselves. When the angle which the projecting direction forms with the gliding plane 5 is equal to 90°, the product 1 is made to project perpendicularly to the gliding plane 5 (at a predetermined distance from it).

In this case, both for rigid products 1, and for deformable products 1, the direction of movement always coincides with the projecting direction until the moment when the first portion 36 touches the support. From that moment onwards, for non-rigid products everything proceeds similarly to as described for an angle equal to 0°. Otherwise, in the case of rigid products, the shifting of the first portion 36 together with the support 2 will cause a rotation of the product 1 which will gradually reduce the angle formed between its own plane of extension and the gliding plane, until the moment when a further portion of the product will project and will finally fall onto the support 2. In order to achieve that result the shifting velocity of the magnetic shuttle will have to be relatively high at the moment of contact between the first portion 36 and the support 2, and will then have to be gradually reduced.

When the angle which the projecting direction forms with the gliding plane 5 is equal to a value between 0° and 90°, as in the embodiment illustrated in the accompanying figures, the sequence of the various steps will be similar to that described for the case at 0°.

The sequence of the various steps relative to product 1 transfer onto the support 2 (for a substantially rigid product 1) is schematically illustrated in FIGS. 8 to 10 relative to an embodiment of the apparatus according to this invention (whose structural aspects will be described below).

FIG. 8 shows the final part of the positioning and feed steps, in which the support 2 and the product 1 are arriving in the respective transfer start positions.

FIG. 9 shows the support 2 and the product 1 in the respective transfer start positions. Depending on the applications the positions may be stationary, adopted by the support 2 and product 1 for a predetermined time, or they may be transit positions which the two adopt substantially at the same instant but without stopping there.

FIG. 10 shows the moment when, during the subsequent transfer step, the product 1 was made to project far enough for its front edge (relative to the direction of forward movement) to be able to fall onto the support 2 below. The front edge therefore constitutes the first portion 36 which makes contact with the support 2.

Continuing to move the product 1 forward with the second velocity, and consequently adapting the first velocity of the support 2 (that is to say, of the magnetic shuttle 4), or vice versa, the transfer step is completed (FIG. 11).

In light of what has been explained, the transfer step is therefore advantageously performed by gradually making the product 1 fall onto the support 2, while the two shift in a coordinated way.

In more detail, while the product 1 is made to move forward, with a known and controlled second velocity, projecting above the planar motor conveyor 3, in such a way as to make it substantially fall towards the planar motor conveyor 3 (the projecting forward movement will advantageously be achieved relative to something which supports the product 1 in the second transfer start position), the magnetic shuttle 4 shifts from the first transfer start position with a known and controlled first velocity. The first velocity (understood to be a vectorial velocity) is always parallel to the gliding plane 5 and, advantageously, may be parallel to the component of the second velocity (understood to be a vectorial component) which is parallel to the gliding plane 5. The direction of the first velocity is either constantly in the same direction as, or constantly opposite to or alternately in the same direction as and opposite to the direction of the component parallel to the gliding plane 5, of the velocity with which the relative product 1 is made to project.

What is described above relative to the transfer step can also be implemented by introducing in the transfer step an inspection step during which an electronic device (for example a camera) is used to check the relative movement of the support 2 and product 1, and the data supplied by the electronic device are used to act on the relative shifting velocities.

In some embodiments, during the feed step the product 1 is made to move forward without controlling its orientation (FIG. 5) so that when it reaches the second transfer start position it has a random orientation (that is to say, it may have any orientation relative to the supporting unit which supports it).

This situation may occur for example, in the case of steaks or other products obtained by slicing larger pieces, which at the moment of cutting fall freely onto an auxiliary conveyor 35 below on which they can adopt any orientation. In these cases, the method according to this invention also comprises an observation step, and an orientation step.

During the observation step, a first electronic device 6 which inspects the product 1 is used to obtain data in electronic format relative the product 1, and, with those data, a first processing device (not illustrated) determines the spatial orientation of the product 1 in the second transfer start position.

In the preferred embodiment the first electronic device 6 is constituted of a camera, and the relative data of one or more images.

In some embodiments, the images (or the data of a different type) may be obtained directly at the second transfer start position. In other embodiments they may be obtained upstream of the second transfer start position (along the path followed by the product 1 during the feed step) provided that the characteristics of the subsequent rigid motion which the product 1 will have to perform until it reaches the second transfer start position are known.

The spatial orientation of the product 1 may be defined in any way suitable for the purpose to be achieved, but in most applications it will advantageously be assessed as a rotation about an axis perpendicular to the gliding plane 5.

As will also be clearer in the following description, the purpose for which the spatial orientation of the product 1 is determined, is that of identifying what would be the optimum positioning of that product 1 on the support 2, and of consequently orienting a resting zone 19 of the magnetic shuttle 4, the zone which supports the support 2, that is to say, in such a way that the real orientation of the support 2 coincides with the ideal orientation.

Figures 16, 17, 18, 19:
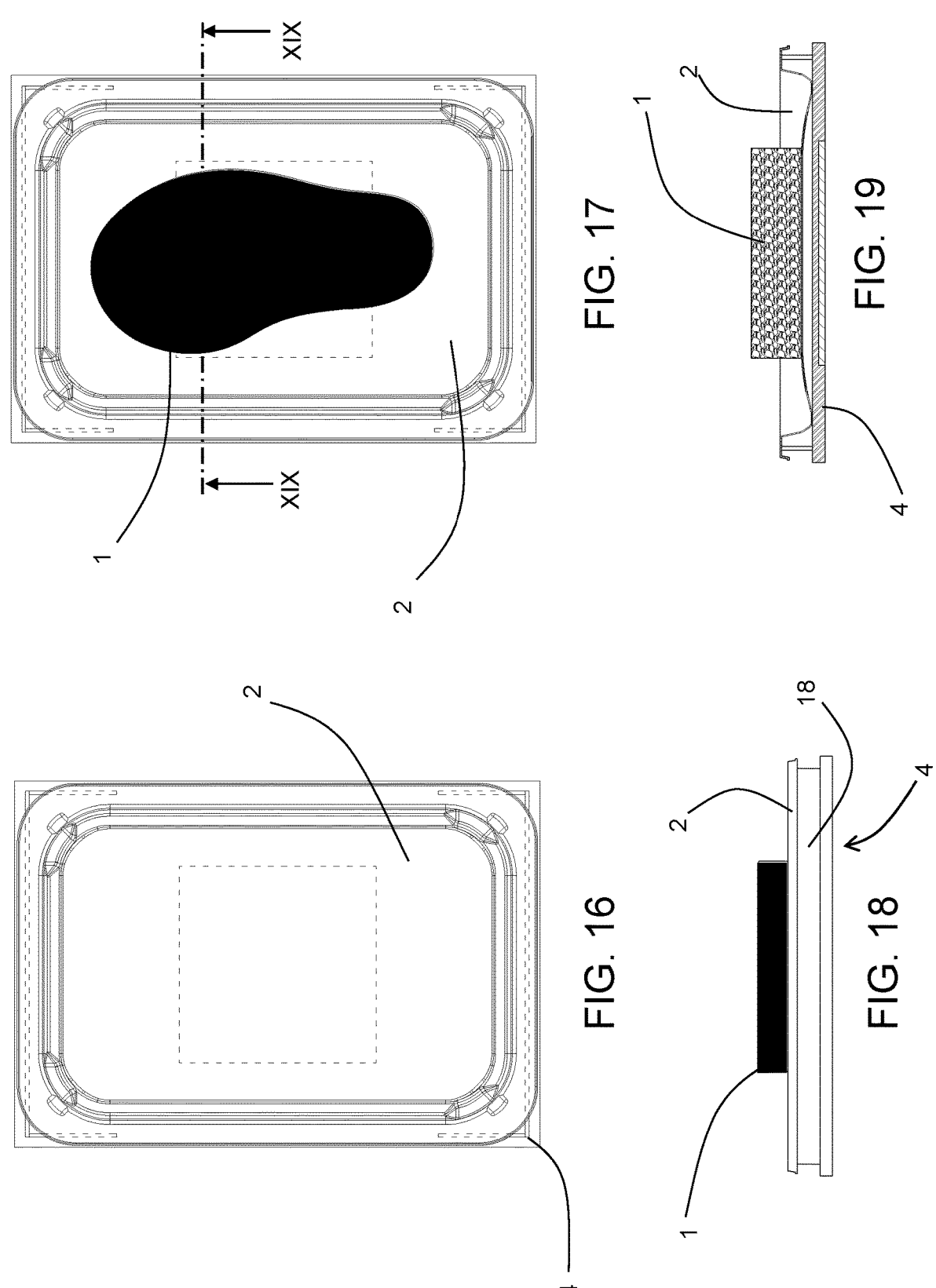
FIG. 16 is a plan view of the magnetic shuttle of FIG. 14 after a support has been loaded onto it.
FIG. 17 is a plan view of the magnetic shuttle and the support of FIG. 16, after a product has been positioned on the support.
FIG. 18 is a front view (that is to say, from the bottom of the drawing of FIG. 17), of the magnetic shuttle, the support and the product of FIG. 17.
FIG. 19 is a cross-section of the magnetic shuttle, the support and the product of FIG. 17 sectioned according to the line XIX-XIX.

In some embodiments the spatial orientation will be assessed by considering the orientation of one or more axes of a polygon, for example a rectangle. The polygon may be for example a polygon in which the product 1 may be inscribed if observed perpendicularly to a lying plane in which it is located in the second transfer start position, in particular a known type of polygon (for example rectangle) which has the minimum area or the minimum perimeter, or, preferably, a polygon which has the same shape or the same proportions which the usable surface of the support 2 has overall. With reference to the latter case, for example, in FIG. 16 the usable surface (the flat central one) of the support 2 is rectangular in plan view with rounded corners; consequently the polygon will be a rectangle with the same proportions as the support 2, advantageously the one with minimum dimensions since it is the one best positionable at the centre of the support 2.

In yet other applications, different polygons may be assessed and the orientation may be calculated for the one of these polygons which can best be inserted inside the support 2 in question.

In one embodiment, the orientation may even be identified by determining a main axis and a secondary axis of the support 2, which are perpendicular to each other, where each axis passes through a central (or barycentric) point of the product 1.

However, the above examples shall not be considered to be limiting and the orientation of the product 1 may be assessed with any technique suitable for the purpose (for example even using artificial intelligence).

In some applications there may even be an additional product 1 rejection step, if following the observation step, for the product it is impossible to identify an orientation which allows its positioning in the support 2; that may happen, for example, if the product 1 has an excessive dimension, such that it prevents product positioning on the support 2.

In other embodiments, there may be a preliminary observation step, performed before the observation step just described and in similar ways to those indicated for the latter, whose purpose is to check that the product 1 has dimensions within a predetermined range (that is to say, not too large and not too small), an appropriate shape and/or other predetermined characteristics. If it does not, the rejection step may be performed early.

Returning to the above observation step, once the product 1 orientation has been determined, the method also comprises an orientation step in which the resting zone 19 of the magnetic shuttle 4 which is in the first transfer start position, is oriented as a function of the spatial orientation of the product 1. Depending on the embodiments, the orientation step may be performed, either before the magnetic shuttle 4 arrives in the first transfer start zone, that is to say, during the feed step, or after it has reached it.

In the preferred embodiments, in which the observation step is performed by determining the orientation of the product 1 with reference to a polygon which reflects the shape of the surface of the resting zone 19 available on the support 2, the subsequent orientation step is performed in such a way as to align the polygon with the support 2. In this way, during the subsequent transfer step the product 1 can be substantially centred on the resting zone of the support 2.

The method according to this invention is advantageously implemented in the various embodiments of the apparatus 7 according to this invention, which will now be described with reference to the accompanying drawings, in which the apparatus 7 overall is labelled with the reference number 1. Consequently, what has been described so far relative to the method shall also be considered valid, if technically applicable, relative to the apparatus 7, just as what is described relative to the apparatus, if technically applicable, shall also be considered important for implementing the method.

FIGS. 1 and 2 show the layout of a production line in which a version of the apparatus 7 according to this invention is inserted, which is interposed between an apparatus 8 for preparing products (in the example illustrated a meat slicing apparatus) and an apparatus 9 for sealing supports 2 with an upper protective film (which may be able to use any sealing technology: vacuum, Skin effect, in a protective atmosphere, in a normal atmosphere, etc.).

However, that shall not be considered to be limiting for this invention, since the apparatus 7 may even be combined with apparatuses different from an apparatus 8 for preparing products or a sealing apparatus 9, or even with no apparatus.

The apparatus 7 for positioning products on supports 2 comprises a supporting structure 10, constituted of one or more elements, on which at least one auxiliary conveyor 35, a planar motor conveyor 3 and, preferably, a support 2 feed device are mounted.

The auxiliary conveyor 35 is associated with the planar motor conveyor 3 above the gliding plane 5 and at an unloading station 16. In some embodiments it may advantageously comprise at least one conveyor belt 11 or another similar device, and extends between a starting end 12 and a final end 13. In the embodiment illustrated in the accompanying figures, there are two auxiliary conveyors 35, since the apparatus 8 for preparing products comprises two meat slicing units (not illustrated), each of which unloads the products sliced by it onto one of the two auxiliary conveyors 35. The presence of two slicing units and, consequently, of two auxiliary conveyors 35 guarantees more constant production even at moments when, the slicing of one piece of meat having ended, the next must be loaded. In general there may be any number of auxiliary conveyors 35. Moreover, each auxiliary conveyor 35 may be configured either to convey a single series of products 1 towards the unloading station 16 (as in the accompanying figures), or to convey a plurality of series of products 1 side by side; in the case, moreover, it may be the case that the products 1 of the different series must be positioned in parallel on a plurality of separate supports 2, or that all of the products 1, or groups of products 1, fed in different series, must be positioned on the same support 2.

The starting end 12 of each auxiliary conveyor 35 is placed near the apparatus 8 for preparing products, for receiving from it the products 1 to be packaged. In contrast, the final end 13 is positioned above the gliding plane 5 of the planar motor conveyor 3, at a distance from it, and is configured in such a way as to unload the products 1 which reach it, directly onto the planar motor conveyor 3 below, advantageously by making them project In the embodiment illustrated in the accompanying figures, the auxiliary conveyor 35 comprises a sliding supporting unit 14 (advantageously a conveyor belt) which moves between a loading station 15, at which, in use, a product 1 is loaded onto the sliding supporting unit 14, and the unloading station 16 which is placed at the final end 13 of the auxiliary conveyor 35, more precisely at the zone where the final end 13 unloads the products 1.

Advantageously, at the unloading station 16, the sliding supporting unit 14 is configured to unload the product 1 by making it project above the gliding plane 5 of the planar motor conveyor 3 below, with a velocity of forward movement which has at least one component parallel to the gliding plane 5 of the planar motor conveyor 3.

The auxiliary conveyor 35 may also comprise a storage zone (not illustrated), in which to accumulate the products 1 arriving if the relative transfer onto supports 2 is not possible at that moment.

The planar motor conveyor 3, in the known way, comprises a gliding plane 5 and a plurality of magnetic shuttles 4 associable with the gliding plane 5.

The gliding plane 5 has a flat upper surface, below which the electromagnetic coils are mounted which, all together, define the actual planar motor.

In the context of this invention, the magnetic shuttles 4 may take any form suitable for the purpose. They may also be configured to each support a single support 2, or simultaneously a plurality of supports 2.

The magnetic shuttles 4 comprise one or more magnetic elements (not illustrated), in particular permanent magnets with two-dimensional distribution, and are configured to be able to be moved over the gliding plane 5 by means of the planar motor, between a plurality of operating stations defined at different zones of the gliding plane 5.

In the preferred embodiment, the magnetic shuttles 4 are also configured to levitate above the gliding plane 5 of the planar motor conveyor 3, and to, in use, glide over the gliding plane 5 without contact; generally the levitation distance may be generally between 1 mm and 2 cm (even if greater distances are in any case possible if appropriate). The levitation of the magnetic shuttles 4 is also achieved by means of the planar motor. Levitating magnetic shuttles 4 may also be used for extremely precise weighing of what is loaded on them (in this case too this is a known technical solution).

Depending on the embodiment, the magnetic shuttles may be able to move with a number of degrees of freedom of between 2 and 6 as described above. In the preferred embodiments they are able to move with at least four degrees of freedom: translation along the axes X, Y and Z and rotation about the axis Z.

In fact, according to the preferred embodiments of this invention (those with orienting of the resting zones 19 of the shuttles), the planar motor conveyor 3 and the magnetic shuttles 4 are configured in such a way as to allow the magnetic shuttles 4 to rotate on themselves about the axis Z, preferably by an angle of at least 180° (the magnetic shuttles 4 being advantageously symmetrical, that allows them to be made to adopt any position over the gliding plane 5). In any case, depending on the applications it will be possible to use both lower angles of rotation, and higher angles or rotation, up to 360°. To allow the rotation about the axis Z advantageously each shuttle comprises at least two permanent magnets at a distance from each other, whose combined movement on the planar motor conveyor 3 allows the rotation to be achieved. In some embodiments, each magnetic shuttle 4 comprises at least two magnetic units 37, each of which comprises at least one active body (not illustrated) in which one or more permanent magnets are installed.

Figures 20, 21, 22:
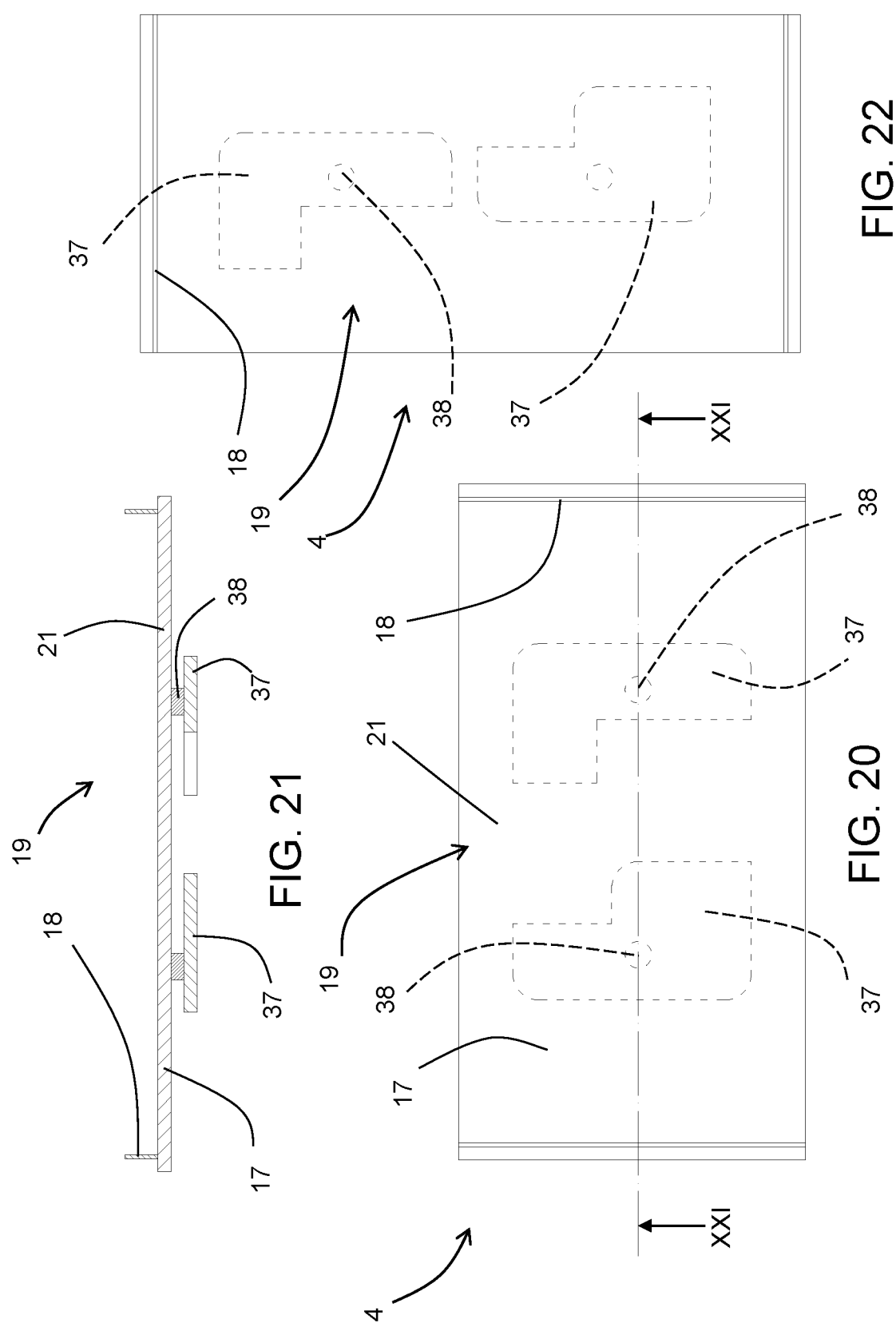
FIG. 20 is a top view of a magnetic shuttle made in accordance with a first alternative embodiment.
FIG. 21 is a cross-section of the magnetic shuttle of FIG. 20 sectioned according to the line XXI-XXI.
FIG. 22 is a top view of the magnetic shuttle of FIG. 20 in a rotated configuration.

In some cases the at least two magnetic units 37 are both rotatably connected, according to respective vertical axes of rotation (defined by the pins 38 in FIGS. 20-22), to a supporting casing 21 which connects them and which defines the resting zone 19 (FIGS. 20-22). The distance between the axes of rotation is fixed and by moving one magnetic shuttle 4 relative to the other, along the axes X and Y, it is possible to cause the rotation of the supporting casing 21.

Figures 23, 24, 25:
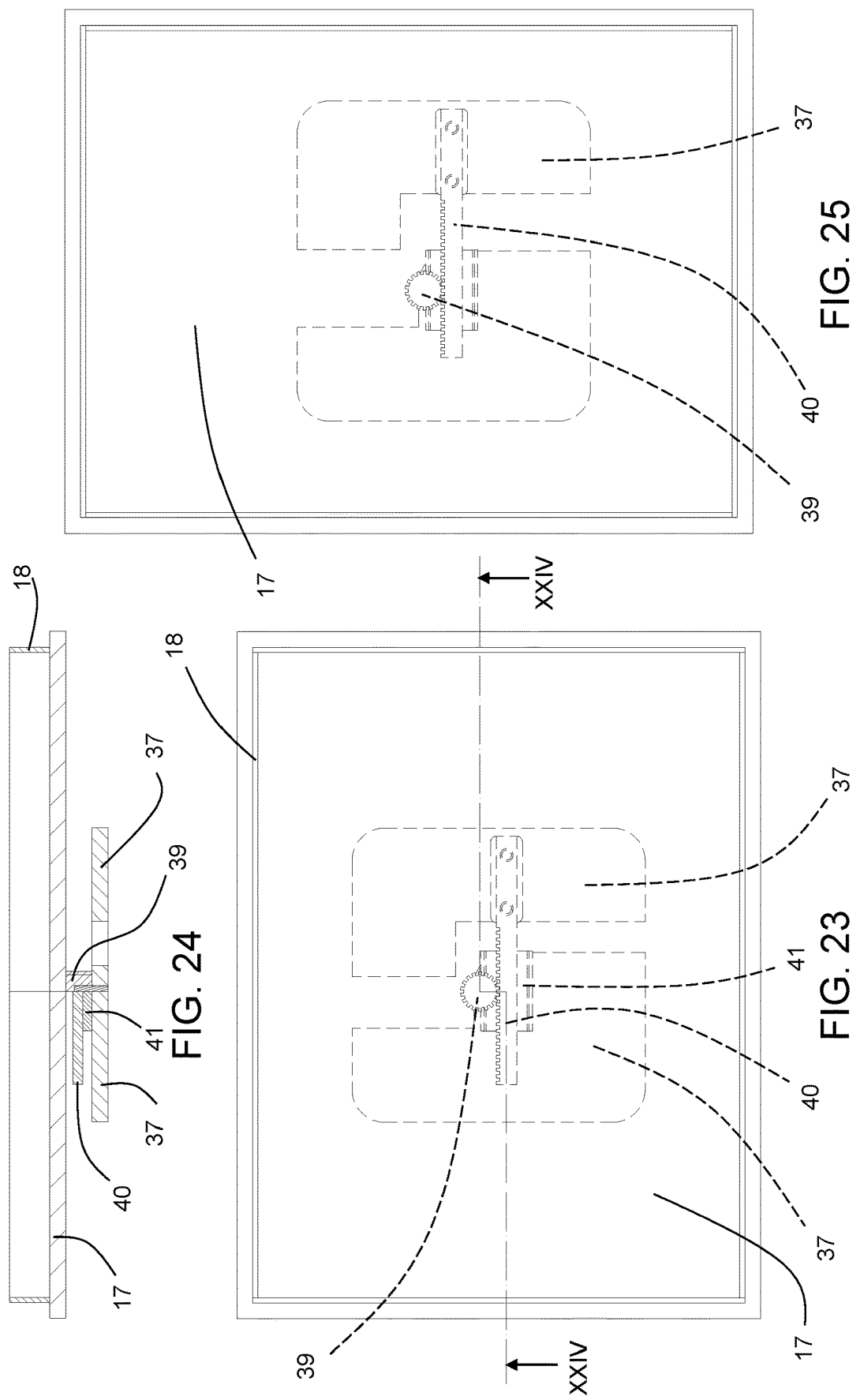
FIG. 23 is a top view of a magnetic shuttle made in accordance with a second alternative embodiment in a first operating configuration.
FIG. 24 is a cross-section of the magnetic shuttle of FIG. 23 sectioned according to the line XXIV-XXIV.
FIG. 25 is a top view of the magnetic shuttle of FIG. 23 in a second operating configuration.

In contrast, in other embodiments, the supporting casing 21 is rotatably connected to one of the at least two magnetic units 37, whilst another is mechanically connected to the first in such a way as to cause the rotations of the supporting casing 21. For example, in the embodiment of FIGS. 23 to 25, the supporting casing 21 is fixed to a gear wheel 39 which is rotatably associated with a magnetic unit 37. The gear wheel 39 meshes with a rack 40 which is rigidly fixed to the other magnetic unit 37. The rack 40 can slide relative to a guide 41 fixed to the first magnetic unit 37, following a movement of the two magnetic units 37 towards/away from each other. The shifting of the rack 40 drives the rotation of the gear wheel 39 and the supporting casing 21 fixed to it. In FIGS. 23 and 25, the movement of the two magnetic units 37 away from each other has caused the supporting casing to rotate by 90°. In contrast, in some embodiments not illustrated, the at least two magnetic units 37 are mechanically separate. Each of them defines part of the resting zone 19 which overall is jointly defined by all of the magnetic units 37. The magnetic units 37 are moved in a combined way by the electronic control unit, in such a way as to always keep the same position relative to each other of the respective parts of the resting zone 19. In order to guarantee rotation of the resting zone 19, each magnetic unit 37 may be able to rotate on itself, or may in turn be made of multiple parts movable one relative to the other (similarly to what is described above for the magnetic shuttles 4.

Figure 15:
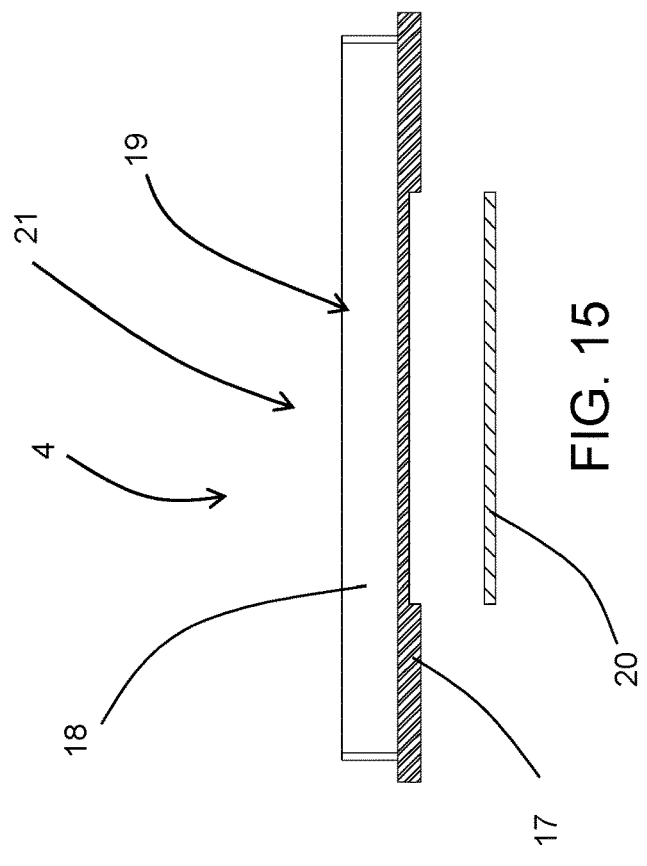
FIG. 15 is an exploded cross-section of the magnetic shuttle of FIG. 14 sectioned according to the line XV-XV.
Figure 14:
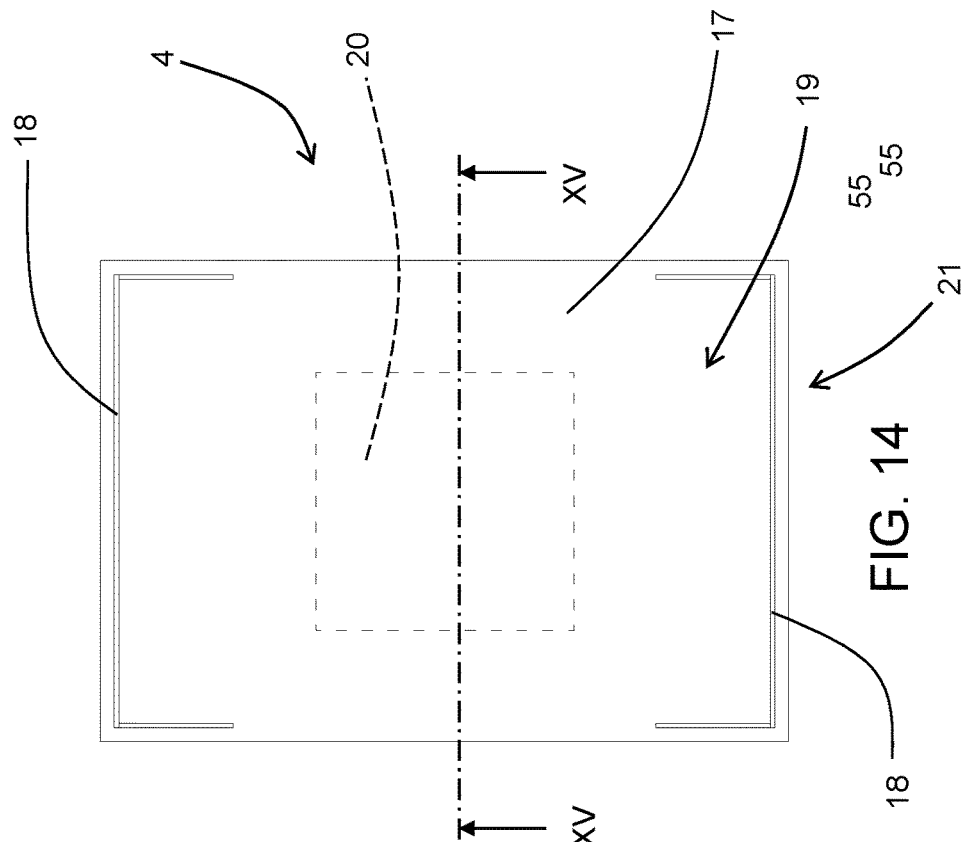
FIG. 14 is a plan view of an embodiment of a magnetic shuttle usable in the context of this invention.

In some embodiments, such as those illustrated in the accompanying FIGS. 14 and 15, each magnetic shuttle 4 comprises a supporting body 17, which in use is positioned parallel to the gliding plane 5, and one or more containment elements 18 which extend upwards from the supporting body 17, and whose purpose is to define a resting zone 19 for retaining correctly positioned the support 2 loaded onto the magnetic shuttle 4.

In some embodiments the planar motor conveyor 3 comprises various groups of magnetic shuttles 4 associable with the gliding plane 5, and the magnetic shuttles 4 of each group are the same as each other and different from those of the other groups; each group is intended for moving supports 2 having a different shape and/or size.

In other embodiments, such as that illustrated in the accompanying FIGS. 14 and 15, each magnetic shuttle 4 comprises at least one active body 20 in which one or more permanent magnets are installed, and a supporting casing 21 mounted on the active body 20 and which defines the resting zone 19 for at least one support 2.

The supporting casing 21 is advantageously separable from the active body 20 (FIG. 15) and, for each magnetic shuttle 4, the conveyor comprises a plurality of interchangeable supporting casings 21, with different shape and/or size, each configured to receive a different model of support 2. That applies in all of the embodiments which comprise a supporting casing 21.

Therefore, depending on the type of support 2 which the apparatus 7 must use, the size change-over operations may be performed, in the first case by substituting the group of magnetic shuttles 4 used, in the second case by changing the supporting casings 21.

The size change-over may be even simpler when the magnetic shuttle 4 is constituted of two or more magnetic units 37 which are mechanically separate. In fact, in this case, it is possible to configure the individual magnetic units 37 in such a way that the size change-over can be performed by simply changing their position relative to each other. For example, there may be only two magnetic units 37, each intended to support one of two opposite edges of the support 2. By changing their distance it will be possible to adapt the magnetic shuttle 4 to a plurality of different sizes of support 2.

In accordance with this invention, between the final end 13 of the auxiliary conveyor 35 and the gliding plane 5 of the planar motor conveyor 3, there is a transit space which, in use, is sized to allow the gliding, over the gliding plane 5 and below the final end of the auxiliary conveyor 35, of a magnetic shuttle 4 with a support 2 loaded onto it. Advantageously the transit space is optimised in such a way that between the support 2 and the auxiliary conveyor 35 there is a small gap, preferably not greater than 5 cm, but even more preferably less than 2 cm and even more preferably less than 1 cm. In some embodiments the transit space is also adjustable in such a way that it can be adapted to supports 2 of different sizes (height).

Moreover, advantageously, the final stretch of the auxiliary conveyor 35 is angled towards the final end 13 to better guide the fall of the products 2.

Figures 12, 13:
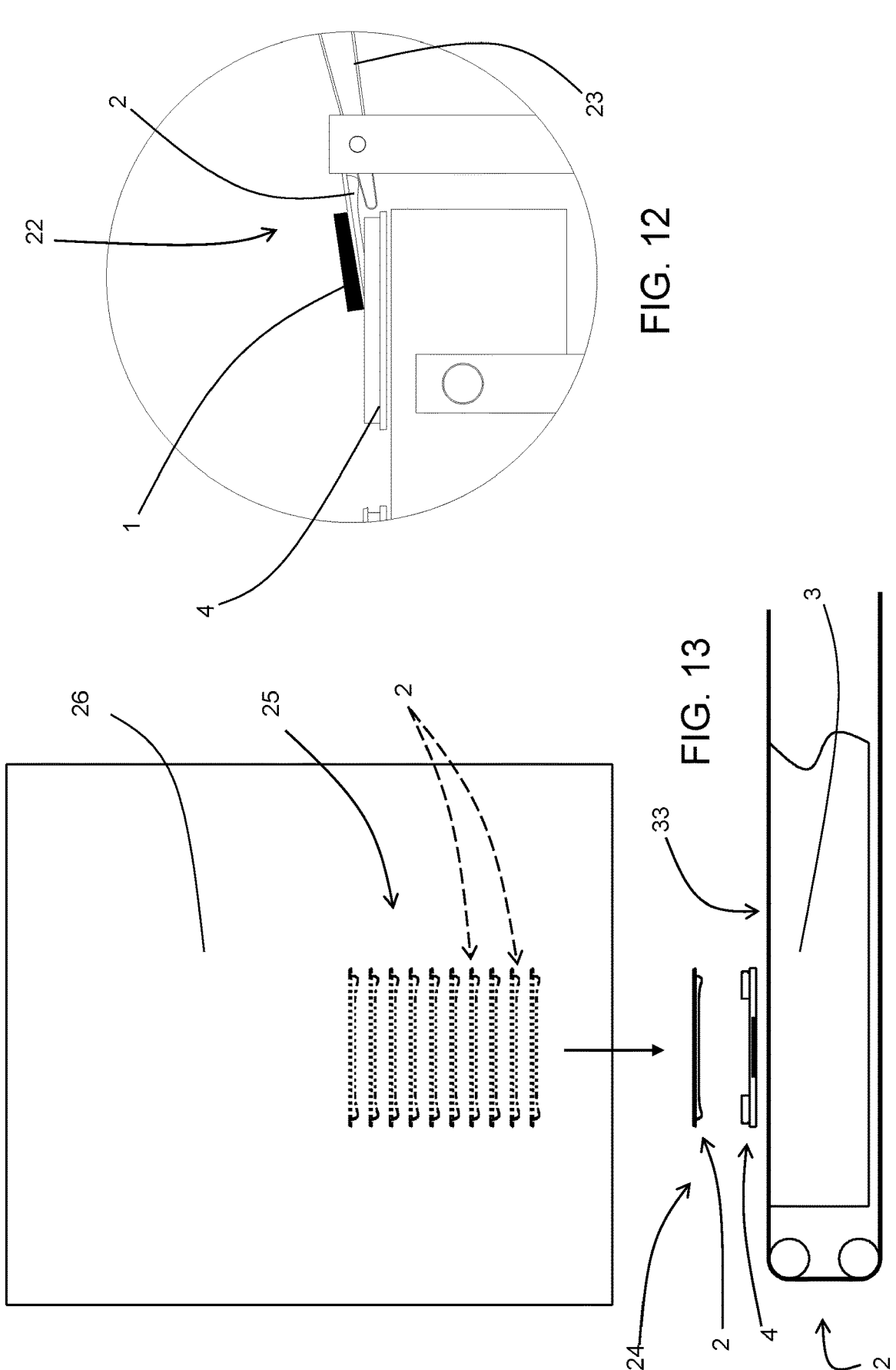
FIG. 12 is an enlarged view of the detail XII of FIG. 7.
FIG. 13 is a schematic front view (from the right relative to the orientation in FIG. 4), of a device for feeding supports of the apparatus of FIG. 4.

The planar motor conveyor 3 also defines even at least one outfeed station 22 (two in the accompanying figures), at which, in use, the supports 2 with the products 1 are removed from the relative magnetic shuttles 4. In the embodiment illustrated in the accompanying figures, at the outfeed station 22 the supports 2 are hooked by a suitable extraction belt 23, which lifts them from the resting zone 19 defined by the magnetic shuttle 4 and removes them from it, then directs them towards the sealing apparatus 9 (FIG. 12).

However, the supports 2 may be removed from the magnetic shuttles 4 in any way depending on requirements.

In some embodiments, the planar motor conveyor 3 is used not just for positioning the products 1 on the supports 2, but also for subsequent processing operations carried out on the supports 2. In that case the outfeed stations 22 are reached by the magnetic shuttles 4 only at the end of all of the processing operations.

Figure 5:
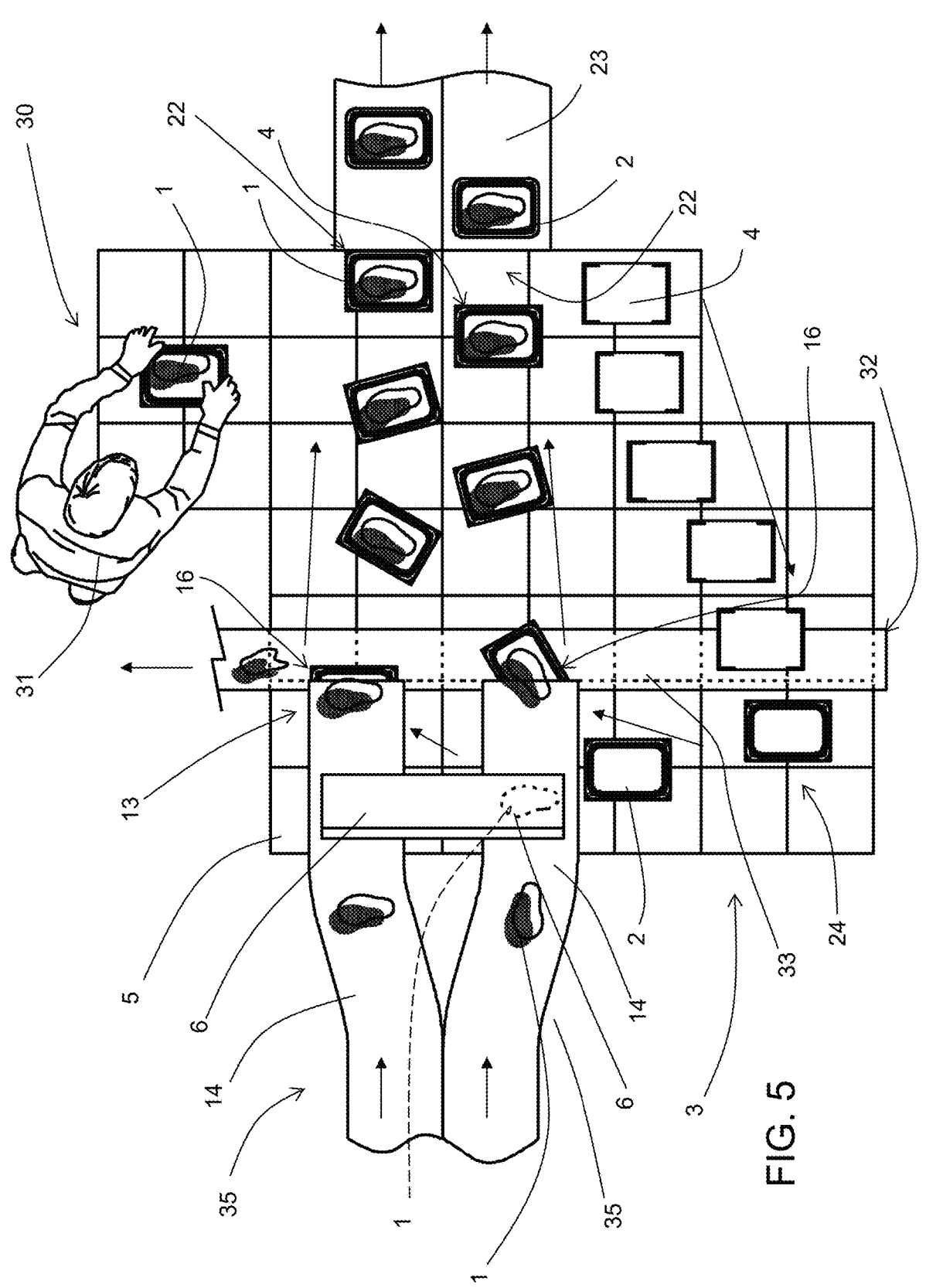
FIG. 5 shows the apparatus of FIG. 4 during use, with some parts cut away to better illustrate others.
Figures 6, 7:
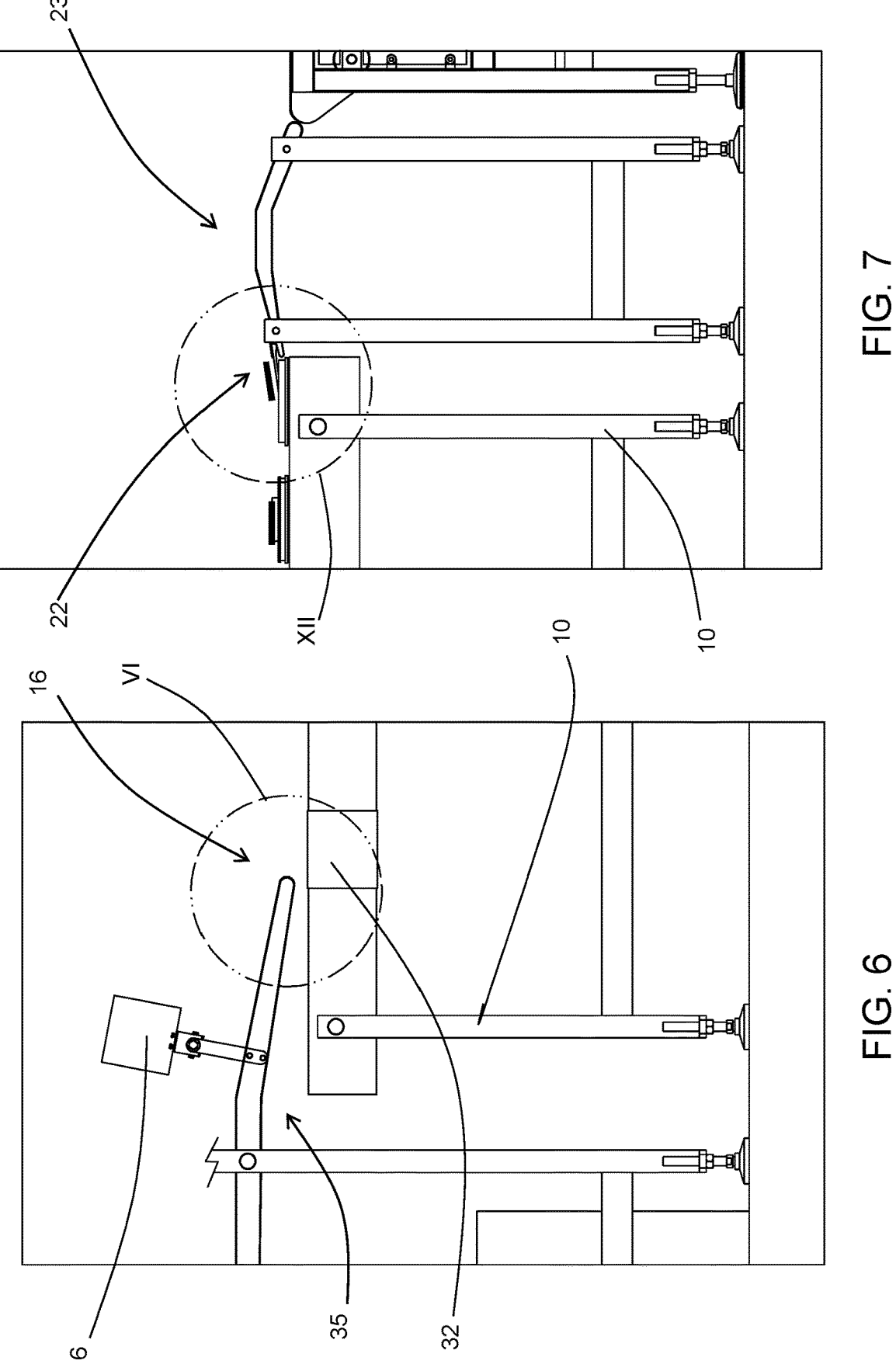
FIG. 6 is an enlarged view of a further detail of the line of FIG. 2.
FIG. 7 is an enlarged view of another detail of the line of FIG. 2 during operation.

Depending on the embodiments the magnetic shuttles 4 from which the supports 2 have been removed may go back using the same gliding plane 5, as illustrated for example in FIG. 5.

In contrast, in other embodiments, the return of the magnetic shuttles 4 may happen by removing them from the gliding plane and loading them onto other external conveyor systems (such as conveyor belts, chains, etc.).

The feed device 26 for the supports 2 is operatively associated with the planar motor conveyor 3 at a feed station 24, and its function is to feed, in use, at least one support 2 onto a magnetic shuttle 4 placed at the feed station 24 (FIG. 13). However, it may also be configured to feed a plurality of supports 2 onto the same magnetic shuttle 4, simultaneously or one after another, or to feed a plurality of supports 2 onto a plurality of separate magnetic shuttles 4, simultaneously or one after another. In the preferred embodiment, the feed device 26 for the supports 2 comprises at least one operating unit placed above the gliding plane 5, which comprises a magazine for housing a stack 25 of supports 2 which are ready for use and is configured to release one support 2 at a time onto the planar motor conveyor 3 below (when a magnetic shuttle 4 is ready to receive it). Advantageously, the distance between the feed device 26 (its operating unit) and the gliding plane 5, is selected in such a way as to keep the support 2 fall travel small enough so that, if the release occurs when a magnetic shuttle 4 is placed in the feed station 24, the support 2 is positioned on the magnetic shuttle 4, in particular on the suitable resting zone 19.

The apparatus 7 comprises an electronic control unit (not illustrated), which is operatively connected at least to the auxiliary conveyor 35, to the planar motor conveyor 3 and to the feed device 26 for controlling their operation in a coordinated way, in particular for implementing the steps of the method described above.

In particular, the electronic control unit is programmed to control the planar motor conveyor 3 in such a way as to make a magnetic shuttle 4 carrying a support 2 pass through the unloading station 16 during the unloading of each product 1 from the sliding supporting unit 14. For information about the ways of moving the magnetic shuttle 4, reference should be made to what is described above relative to the method.

In other embodiments, if necessary for improved positioning of the product 1 on the support 2, in any case the velocity of forward movement of each magnetic shuttle 4, in the unloading station 16, may differ in the known way relative to the component parallel to the gliding plane 5, of the velocity with which the relative product 1 is made to project from the final end 13 of the mechanical conveyor 35. For example, in the case in which the support 2 has a convex surface, in order to make a product 1 adhere to that surface, the magnitude of the velocity of forward movement of the magnetic shuttle 4 may be less than the magnitude of the component parallel to the gliding plane 5 of the velocity of the product 1.

Depending on the embodiments, the electronic control unit may be programmed to control the planar motor conveyor 3, at the unloading station 16, in such a way as to move each magnetic shuttle 4 with a velocity of forward movement whose magnitude is equal to, greater than or less than the magnitude of the component parallel to the gliding plane 5 of the velocity with which the relative product 1 is made to project from the final end 13 of the auxiliary conveyor 35, and whose direction is either constantly in the same direction as, or constantly opposite to or alternately in the same direction as and opposite to the direction of the component parallel to the gliding plane 5, of the velocity with which the relative product 1 is made to project from the final end 13 of the auxiliary conveyor 35.

In some embodiments, such as those in which the products 1 are loaded onto the auxiliary conveyor 35 without a predetermined orientation, the electronic control unit may be programmed to control the planar motor conveyor 3 in such a way as to orient each resting zone of the magnetic shuttles 4 at the unloading station 16, as a function of the spatial orientation of the product 1, arriving at the unloading station 16, to be loaded onto each magnetic shuttle 4. When that orientation of the product 1 is unknown (if it is already known, what is described in this paragraph is not necessary), the apparatus 7 advantageously also comprises a first electronic device 6 and a first processing device (not illustrated). The first electronic device 6 is associated with the auxiliary conveyor 35, in particular with the sliding supporting unit 14, for inspecting each product 1 arriving at the unloading station 16. The first processing device is operatively connected to the first electronic device 6, for receiving from it data relative to each product 1, and is programmed to determine the spatial orientation of the product 1 on the auxiliary conveyor 35, in particular on the sliding supporting unit 14, by processing those data.

In the preferred embodiment, the first electronic device 6 is an electronic camera which frames in the viewfinder the auxiliary conveyor 35 or the sliding supporting unit 14 in order to acquire at least one photograph of each product 1, and the data are constituted of one or more photographs.

The orientation of the resting zone of each magnetic shuttle 4 is determined by the electronic control unit by making the magnetic shuttle 4 rotate on itself and/or by causing a change in the configuration of interconnected parts which constitute the magnetic shuttle 4 (for example the magnetic units 37 and the supporting casing 21) and/or by moving in a synchronised way parts which are separate from each other which constitute the magnetic shuttle 4 (in that case only the magnetic units 37), in the ways described above.

In some embodiments, the apparatus 7 also comprises a second electronic device 27, a second processing device and an ejection unit 28 (which is part of the auxiliary conveyor 35). The second electronic device 27 is associated with the auxiliary conveyor 35 for inspecting each product 1 loaded onto it; in some embodiments the first electronic device 6 and the second electronic device 27 may coincide; that applies especially if the motion of each product 1 when passing from the position in which it is inspected by the second electronic device 27, to the unloading station 16 is known with certainty.

The second processing device is operatively connected to the second electronic device 27, for receiving from it data relative to each product 1, and is programmed to determine the shape and/or the size and/or other characteristics of the product 1 using those data.

The assessment of the other characteristics of the product 1 will generally be linked to the assessment of product 1 conformity to predetermined quality standards (for example, the quantity of fat, the appearance, the colour, etc.).

In the preferred embodiment, the second electronic device 27 is also an electronic camera which frames in the viewfinder the auxiliary conveyor 35 in order to acquire at least one photograph of each product 1, and the data are constituted of one or more photographs.

Figures 3, 4:
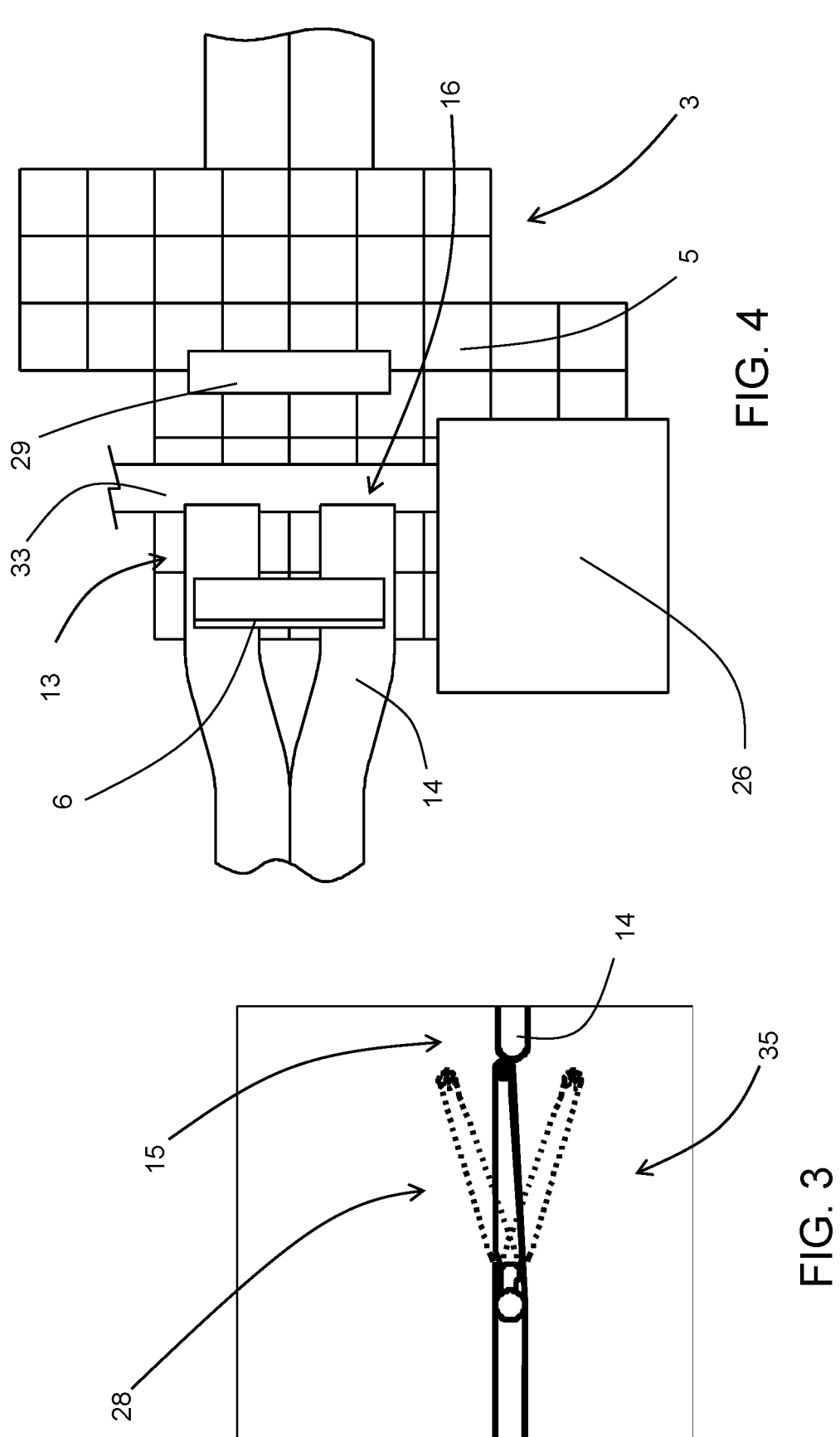
FIG. 3 is an enlarged view of the detail III of FIG. 2.
FIG. 4 is an enlarged view of a detail of FIG. 1 which corresponds to the apparatus for positioning products on supports according to this invention.

The ejection unit 28 for the products 1 is placed upstream of the unloading station 16 and downstream of the second electronic device 27 and can be activated by the electronic control unit as a function of the shape and/or of the size of the product determined by the second processing device. Advantageously the electronic control unit is programmed to activate the ejection unit 28 for ejecting a product 1 from the auxiliary conveyor 35 whenever the shape and/or the size of the product 1 are outside of a predetermined shape and/or size range. In the embodiment illustrated in FIG. 3, the ejection unit 28 is constituted of a movable stretch of the auxiliary conveyor 35, immediately upstream of the sliding supporting unit 14, which can be moved out of alignment with the rest of the auxiliary conveyor 35, to direct the product 1 towards one or more suitable pick-up devices (not illustrated in the accompanying figures, in which there may be two, one above and one below the auxiliary conveyor 35).

However, it should be noticed that the second processing device may classify the products 1 to be ejected, either as products 1 which absolutely cannot be processed, or as products 1 which could be processed subject to action by the operator (for example to remove a portion of excess fat) and, based on that classification, control the ejection unit 28 in different ways. In the case described above, for example, the products 1 which absolutely cannot be processed, and the products 1 which could be processed subject to action by the operator, may be directed towards a different pick-up device.

The second electronic device may also be used to check that there are no foreign bodies moved by the auxiliary conveyor 35.

In some embodiments, the apparatus 7 comprises a third electronic device 29, which is associated with a gliding plane 5 transit zone. The transit zone is a zone at which each magnetic shuttle 4, after having received a support 2 and a product 1, and which moves from the unloading station 16 towards the outfeed station 22 is made to pass.

The third electronic device 29 inspects the product 1 and the support 2 loaded onto each magnetic shuttle 4 and sends data relative to them, to a third processing device operatively connected to it, not illustrated). The third processing device is programmed to determine the position of the product 1 on the support 2, and to assess whether or not that position is amongst those acceptable for the subsequent sealing apparatus 9, and/or to assess other characteristics of the product and/or of the support 2 (that is to say, also of other products or objects loaded onto the support 2, even to check for the absence of foreign bodies).

In the preferred embodiment, the third electronic device 29 is also an electronic camera which frames in the viewfinder the auxiliary conveyor 35 in order to acquire at least one photograph of each product 1 placed on the relative support 2, and the data are constituted of one or more photographs.

The electronic control unit is programmed to direct the magnetic shuttle 4 to the outfeed station 22 or to an ejection station 30, as a function of the position of the product 1 on the support 2 determined by the third processing device. In particular, the magnetic shuttle 4 is sent to the outfeed station 22, if the position of the product 1 on the support 2 is amongst those which are acceptable, whilst, if it is not, the magnetic shuttle 4 is sent to the ejection station 30 where, for example, an operator 31 can remove the support 2 with the incorrectly positioned product 1 (FIG. 5). In some cases, for example if the product 1 is missing or there is an insufficient quantity of product 1, the magnetic shuttle 4 may even be sent back to the unloading station to correct the problem.

Alternatively, the third electronic device 29 may be constituted of the planar motor conveyor 3 used for weighing the product 1 loaded onto the support 2 (obviously the weight of the product 1 may be fixed or variable depending on the type of products 1 which the apparatus 7 is intended to manage).

Depending on the embodiments, each of the first processing device, the second processing device and the third processing device, may be constituted of the electronic control unit.

If there are two or more unloading stations and/or two or more outfeed stations, the electronic control unit is advantageously programmed to be able to transfer a magnetic shuttle 4 onto which a product 1 has been loaded in any unloading station 16, to any of the outfeed stations. Advantageously, if there are multiple outfeed stations present, the choice of the outfeed station 22 to which each magnetic shuttle 4 will be directed is made in such a way as to try to guarantee full productivity for each apparatus 7 placed downstream of the outfeed stations; in that case the electronic control unit will also be operatively connected to similar units belonging to the other apparatuses of the plant.

In order to avoid the risk that, by mistake, at the unloading station 16 any products 1 may fall directly onto the gliding plane 5 rather than onto a magnetic shuttle 4, thereby stopping plant operation, in some embodiments the apparatus 7 may also comprise an auxiliary conveyor belt 32. The auxiliary conveyor belt 2 comprises an active stretch 33 which slides on the gliding plane 5 passing through the unloading station 16. The function of the auxiliary conveyor belt 32 is to receive any products 1 which fall from the final end 13 of the auxiliary conveyor 35 onto the gliding plane 5 when there is no magnetic shuttle 4 ready to receive them (such as the product 1 labelled 100 in FIG. 5), and to move them away from the gliding plane 5. The belt of the auxiliary conveyor belt 32 will advantageously have a thickness which is less than the levitation height of the magnetic shuttles 4, in such a way that the latter can pass above it without being obstructed.

Operation of the apparatus 7 according to this invention is obvious from the structural description above.

For each magnetic shuttle 4 it is possible to identify an operating cycle which starts at the feed station 24 and which is illustrated overall in FIG. 5 (in which the feed station 24 is not illustrated).

When the magnetic shuttle 4 is placed in the feed station 24, the feed device 26 positions at least one support 2 on the relative resting zone 19 defined by the magnetic shuttle 4.

The magnetic shuttle 4 is then made to move forward towards the unloading station 16, until it reaches the first transfer start position, in which it is located below the final end 13 of the auxiliary conveyor 35.

Meanwhile, a product 1 loaded onto the auxiliary conveyor 35, after having passed the check run by the second electronic device 27, by means of the sliding supporting unit 14 is made to move forward until it is at the second transfer start position, in which it is located near the final end 13. During this forward movement, the product 1 is inspected by the first electronic device 6 (photographed by the first camera), and the first processing device determines its orientation. The information about the product 1 orientation is supplied to the electronic control unit, which similarly orients the resting zone of the magnetic shuttle 4 located or arriving at the first transfer start position, in the ways described above.

At that point, the product 1 and the relative magnetic shuttle 4 are made to move forward with synchronised velocities, in such a way that the product 1 is transferred into the support 2 with the desired positioning.

The planar motor conveyor 3 then moves the magnetic shuttle 4 forward as far as the outfeed station 22, in the meantime orienting it in the best way to allow the subsequent removal of the support 2. Along this path the shuttle may pass through the transit zone and be inspected by the third electronic device 29 and the third processing device, in order to check if it can reach the outfeed station 22, or if it must be sent towards the ejection station 30 or sent back to the unloading station 16.

This invention brings important advantages.

In fact, thanks to this invention it was possible to provide an apparatus and a method which allow the automatic, precise positioning on a support even of products without dimensional stability or which are different from each other, such as pieces of meat obtained by slicing larger pieces.

Furthermore, thanks to this invention it was possible to provide an apparatus and a method for positioning products on supports which allowing regular and repeatable positioning even of products which are fed in an irregular way which is not known in advance.

Last but not least, thanks to this invention, when handling food products it is possible to reduce the risk of contamination compared with that of prior art methods and apparatuses.

Finally, it should be noticed that this invention is relatively easy to produce and that even the cost linked to implementing the invention is not very high.

The invention described above may be modified and adapted in several ways without thereby departing from the scope of the inventive concept.

All details may be substituted with other technically equivalent elements and the materials used, as well as the shapes and dimensions of the various components, may vary according to requirements.

What is claimed is:

1. An apparatus for positioning products on supports, comprising:
   a supporting structure;
   a planar motor conveyor, which is mounted on the supporting structure, which defines a gliding plane and which comprises a plurality of magnetic shuttles associable with the gliding plane, for being moved over the gliding plane by means of the planar motor, between a plurality of operating stations, each magnetic shuttle being configured to convey at least a support;

an auxiliary conveyor which is associated with the planar motor conveyor above the gliding plane at an unloading station, at the unloading station between the auxiliary conveyor and the gliding plane of the planar motor conveyor there being a transit space present which, in use, allows the gliding of at least one magnetic shuttle with at least one support loaded onto it; and an electronic control unit operatively connected to the auxiliary conveyor and to the planar motor conveyor for controlling their operation in a coordinated way;

wherein moreover:

at the unloading station the auxiliary conveyor is configured to unload the product above the planar motor conveyor below;

during the unloading of each product from the auxiliary conveyor, the electronic control unit is programmed to control the planar motor conveyor for, in use, making a magnetic shuttle onto which a support has been loaded, move through the unloading station; each magnetic shuttle defines a resting zone for at least one support;

the apparatus also comprises a first electronic device, which is associated with the auxiliary conveyor for inspecting each product arriving at the unloading station, and a first processing device operatively connected to the first electronic device, for receiving from it data relative to each product, and programmed to determine the spatial orientation of the product on the auxiliary conveyor using those data; and the electronic control unit is also programmed to control the planar motor conveyor for orienting the resting zone of each magnetic shuttle, at the unloading station, as a function of the spatial orientation of the product arriving at the unloading station to be loaded onto the magnetic shuttle;

wherein each magnetic shuttle comprises at least two magnetic units, each of which comprises at least one active body in which one or more permanent magnets are installed, and wherein:

said at least two magnetic units are rotatably connected to a supporting casing which defines the resting zone; or said at least two magnetic units are mechanically separate and are moved in a combined way by the electronic control unit, the resting zone being jointly defined by all of the magnetic units.

2. The apparatus according to claim 1, wherein the orientation of the resting zone of each magnetic shuttle is determined by the electronic control unit by making the magnetic shuttle rotate on itself and/or by causing a change in the configuration of interconnected parts which constitute the magnetic shuttle and/or by moving in a synchronised way parts which are separate from each other which constitute the magnetic shuttle.

3. The apparatus according to claim 1, wherein the spatial orientation of the product is assessed as rotation of the product about an axis perpendicular to the gliding plane.

4. The apparatus according to claim 1, comprising a second electronic device, which is associated with the auxiliary conveyor for inspecting each product loaded onto it, a second processing device operatively connected to the second electronic device for receiving from it data relative to each product, and programmed to determine the shape and/or the size and/or other characteristics of the product using those data, the auxiliary conveyor also comprising an ejection unit for the products, placed upstream of the unloading station, the electronic control unit being programmed to activate the ejection unit for ejecting a product as a function of the shape and/or of the size and/or of other characteristics of the product determined by the second processing device.

5. The apparatus according to claim 1, comprising a third electronic device, which is associated with a gliding plane transit zone, at which each magnetic shuttle which moves from the unloading station towards an outfeed station is made to pass, for inspecting the product and the support which are loaded onto each magnetic shuttle, and a third processing device operatively connected to the third electronic device, for receiving from it data relative to each support and product, and programmed to determine the position of the product on the support and/or other characteristics of the product and/or of the support using those data, the electronic control unit being programmed to direct the shuttle to the outfeed station or to an ejection station or to the unloading station, as a function of the position of the product on the support and/or of the other characteristics of the product and/or of the support determined by the third processing device.

6. The apparatus according to claim 1, wherein, at the unloading station, the auxiliary conveyor is configured to unload the product by making it project, above the planar motor conveyor below.

7. The apparatus according to claim 6, wherein the electronic control unit is programmed to control the planar motor conveyor, at the unloading station, in such a way as to move the magnetic shuttle onto which the support has been loaded, in such a way that it is synchronised with the projecting of the product to be loaded onto it.

8. The apparatus according to claim 7, wherein the electronic control unit is programmed to control the planar motor conveyor, at the unloading station, in such a way as to move each magnetic shuttle with a velocity of forward movement whose magnitude and whose direction are determined as a function of the velocity with which the relative product is made to project from the final end of the auxiliary conveyor.

9. The apparatus according to claim 6, wherein the auxiliary conveyor is configured to make the product project, with a velocity of forward movement which has at least one component parallel to the gliding plane of the planar motor conveyor and wherein, during the unloading of each product from the sliding supporting unit, the electronic control unit is programmed to, in use, make said magnetic shuttle onto which the support has been loaded move through the unloading station, making it shift parallel to said component of the velocity of forward movement of the product which is parallel to the gliding plane of the planar motor conveyor.

10. The apparatus according to claim 6, wherein the auxiliary conveyor is configured to make the product project, with a velocity of forward movement which has at least one component parallel to the gliding plane of the planar motor conveyor and wherein the electronic control unit is programmed to control the planar motor conveyor, at the unloading station, in such a way as to move each magnetic shuttle with a velocity of forward movement whose magnitude is equal to, greater than or less than the magnitude of the component parallel to the gliding plane of the velocity with which the relative product is made to project from the final end of the auxiliary conveyor, and whose direction is either constantly in the same direction as, or constantly opposite to or alternately in the same direction as and opposite to the direction of the component parallel to the gliding plane, of the velocity with which the relative product is made to project from the final end of the auxiliary conveyor.

11. The apparatus according to claim 1, wherein the magnetic shuttles are also configured to levitate above the gliding plane of the planar motor conveyor and to, in use, glide over the gliding plane without contact.

12. An apparatus for positioning products on supports, comprising:

a supporting structure;

a planar motor conveyor, which is mounted on the supporting structure, which defines a gliding plane and which comprises a plurality of magnetic shuttles associable with the gliding plane, for being moved over the gliding plane by means of the planar motor, between a plurality of operating stations, each magnetic shuttle being configured to convey at least a support; an auxiliary conveyor which is associated with the planar motor conveyor above the gliding plane at an unloading station, at the unloading station between the auxiliary conveyor and the gliding plane of the planar motor conveyor there being a transit space present which, in use, allows the gliding of at least one magnetic shuttle with at least one support loaded onto it; and an electronic control unit operatively connected to the auxiliary conveyor and to the planar motor conveyor for controlling their operation in a coordinated way;

wherein moreover:

at the unloading station the auxiliary conveyor is configured to unload the product above the planar motor conveyor below;

during the unloading of each product from the auxiliary conveyor, the electronic control unit is programmed to control the planar motor conveyor for, in use, making a magnetic shuttle onto which a support has been loaded, move through the unloading station; each magnetic shuttle defines a resting zone for at least one support;

the apparatus also comprises a first electronic device, which is associated with the auxiliary conveyor for inspecting each product arriving at the unloading station, and a first processing device operatively connected to the first electronic device, for receiving from it data relative to each product, and programmed to determine the spatial orientation of the product on the auxiliary conveyor using those data; and the electronic control unit is also programmed to control the planar motor conveyor for orienting the resting zone of each magnetic shuttle, at the unloading station, as a function of the spatial orientation of the product arriving at the unloading station to be loaded onto the magnetic shuttle;

the apparatus also comprising an auxiliary conveyor belt which comprises an active stretch which slides on the gliding plane, which passes through the unloading station to receive any products which fall from the final end of the auxiliary conveyor onto the gliding plane.

13. The apparatus according to claim 12, wherein the orientation of the resting zone of each magnetic shuttle is determined by the electronic control unit by making the magnetic shuttle rotate on itself and/or by causing a change in the configuration of interconnected parts which constitute the magnetic shuttle and/or by moving in a synchronised way parts which are separate from each other which constitute the magnetic shuttle.

14. The apparatus according to claim 12, wherein the spatial orientation of the product is assessed as rotation of the product about an axis perpendicular to the gliding plane.

15. The apparatus according to claim 12, comprising a second electronic device, which is associated with the auxiliary conveyor for inspecting each product loaded onto it, a second processing device operatively connected to the second electronic device for receiving from it data relative to each product, and programmed to determine the shape and/or the size and/or other characteristics of the product using those data, the auxiliary conveyor also comprising an ejection unit for the products, placed upstream of the unloading station, the electronic control unit being programmed to activate the ejection unit for ejecting a product as a function of the shape and/or of the size and/or of other characteristics of the product determined by the second processing device.

16. The apparatus according to claim 12, comprising a third electronic device, which is associated with a gliding plane transit zone, at which each magnetic shuttle which moves from the unloading station towards an outfeed station is made to pass, for inspecting the product and the support which are loaded onto each magnetic shuttle, and a third processing device operatively connected to the third electronic device, for receiving from it data relative to each support and product, and programmed to determine the position of the product on the support and/or other characteristics of the product and/or of the support using those data, the electronic control unit being programmed to direct the shuttle to the outfeed station or to an ejection station or to the unloading station, as a function of the position of the product on the support and/or of the other characteristics of the product and/or of the support determined by the third processing device.

17. The apparatus according to claim 12, wherein, at the unloading station, the auxiliary conveyor is configured to unload the product by making it project, above the planar motor conveyor below.

18. The apparatus according to claim 17, wherein the electronic control unit is programmed to control the planar motor conveyor, at the unloading station, in such a way as to move the magnetic shuttle onto which the support has been loaded, in such a way that it is synchronised with the projecting of the product to be loaded onto it.

19. The apparatus according to claim 18, wherein the electronic control unit is programmed to control the planar motor conveyor, at the unloading station, in such a way as to move each magnetic shuttle with a velocity of forward movement whose magnitude and whose direction are determined as a function of the velocity with which the relative product is made to project from the final end of the auxiliary conveyor.

20. The apparatus according to claim 17, wherein the auxiliary conveyor is configured to make the product project, with a velocity of forward movement which has at least one component parallel to the gliding plane of the planar motor conveyor and wherein, during the unloading of each product from the sliding supporting unit, the electronic control unit is programmed to, in use, make said magnetic shuttle onto which the support has been loaded move through the unloading station, making it shift parallel to said component of the velocity of forward movement of the product which is parallel to the gliding plane of the planar motor conveyor.

21. The apparatus according to claim 17, wherein the auxiliary conveyor is configured to make the product project, with a velocity of forward movement which has at least one component parallel to the gliding plane of the planar motor conveyor and wherein the electronic control unit is programmed to control the planar motor conveyor, at the unloading station, in such a way as to move each magnetic shuttle with a velocity of forward movement whose magnitude is equal to, greater than or less than the magnitude of the component parallel to the gliding plane of the velocity with which the relative product is made to project from the final end of the auxiliary conveyor, and whose direction is either constantly in the same direction as, or constantly opposite to or alternately in the same direction as and opposite to the direction of the component parallel to the gliding plane, of the velocity with which the relative product is made to project from the final end of the auxiliary conveyor.

22. The apparatus according to claim 12, wherein the magnetic shuttles are also configured to levitate above the gliding plane of the planar motor conveyor and to, in use, glide over the gliding plane without contact.

* * * * *